US009935945B2

(12) United States Patent
Li

(10) Patent No.: US 9,935,945 B2
(45) Date of Patent: Apr. 3, 2018

(54) TRUSTED MANAGEMENT CONTROLLER FIRMWARE

(71) Applicant: Quanta Computer Inc., Taoyuan (TW)

(72) Inventor: Yung-Fu Li, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 231 days.

(21) Appl. No.: 14/933,477

(22) Filed: Nov. 5, 2015

(65) Prior Publication Data

US 2017/0134373 A1    May 11, 2017

(51) Int. Cl.
    *G06F 21/57* (2013.01)
    *H04L 29/06* (2006.01)
    *G06F 21/44* (2013.01)
    *G06F 21/85* (2013.01)

(52) U.S. Cl.
CPC ......... *H04L 63/0853* (2013.01); *G06F 21/44* (2013.01); *G06F 21/572* (2013.01); *G06F 21/85* (2013.01); *H04L 63/0442* (2013.01); *H04L 63/061* (2013.01); *H04L 63/08* (2013.01); *H04L 63/123* (2013.01); *G06F 2221/2107* (2013.01)

(58) Field of Classification Search
None
See application file for complete search history.

(56) References Cited

U.S. PATENT DOCUMENTS

| | | | | |
|---|---|---|---|---|
| 6,587,945 B1 * | 7/2003 | Pasieka | ............... | G06F 21/6209 705/3 |
| 2003/0028809 A1 * | 2/2003 | Goodman | ............. | G06F 17/211 726/4 |
| 2003/0123670 A1 * | 7/2003 | Shimada | ................. | G06F 21/10 380/281 |
| 2003/0149670 A1 * | 8/2003 | Cronce | ................. | G06F 21/121 705/59 |
| 2003/0158823 A1 * | 8/2003 | Fulton | ..................... | G06F 21/10 705/75 |
| 2003/0188165 A1 * | 10/2003 | Sutton, II | ............ | G06F 12/1458 713/176 |
| 2004/0105548 A1 * | 6/2004 | Fujiwara | ............... | G06F 21/123 380/277 |

(Continued)

FOREIGN PATENT DOCUMENTS

CN            103944913 A      7/2014

OTHER PUBLICATIONS

Taiwanese Application No. 105100612, Taiwanese Office Action No. 10521476520 dated Nov. 29, 2016 w/ First Office Action Summary.

*Primary Examiner* — Malcolm Cribbs
(74) *Attorney, Agent, or Firm* — Nixon Peabody LLP; Eduardo J. Quinones; Zhou Lu

(57) ABSTRACT

A method for ensuring management controller firmware security, by a security manager of a computing device, includes storing a public key and raw identity data, and obtaining, from a management firmware for a management controller of the computing device, encrypted identity data. The security manager decrypts the encrypted identity data with the public key into decrypted identity data, and compares the decrypted identity data with the raw identity data to determine whether the management firmware is authentic. The security manager protects the computing device from harm by the management firmware, in response to determining that the management firmware is not authentic.

20 Claims, 4 Drawing Sheets

(56) References Cited

U.S. PATENT DOCUMENTS

| | | | | |
|---|---|---|---|---|
| 2004/0216031 A1* | 10/2004 | Taylor | G06F 21/64 | 715/263 |
| 2005/0251488 A1* | 11/2005 | Saunders | G06F 21/121 | 705/59 |
| 2006/0005046 A1* | 1/2006 | Hars | G06F 21/572 | 713/191 |
| 2007/0208944 A1* | 9/2007 | Pavlicic | G06F 21/645 | 713/176 |
| 2008/0040808 A1* | 2/2008 | Tokie | G06F 21/645 | 726/26 |
| 2008/0141380 A1* | 6/2008 | Ikeda | G06F 21/10 | 726/27 |
| 2010/0037066 A1* | 2/2010 | Miyabe | G06F 21/52 | 713/189 |
| 2010/0217987 A1* | 8/2010 | Shevade | G06F 21/6272 | 713/175 |
| 2011/0099388 A1* | 4/2011 | Hett | G06F 21/645 | 713/193 |
| 2011/0311051 A1* | 12/2011 | Resch | H04L 63/06 | 380/270 |
| 2013/0198523 A1* | 8/2013 | Wu | G06F 21/57 | 713/182 |
| 2013/0318357 A1* | 11/2013 | Abraham | G06F 21/57 | 713/176 |
| 2014/0250291 A1 | 9/2014 | Adams et al. | | |
| 2014/0365755 A1* | 12/2014 | Liu | G06F 21/572 | 713/2 |
| 2015/0088707 A1* | 3/2015 | Drury | G06Q 40/12 | 705/30 |
| 2015/0347734 A1* | 12/2015 | Beigi | G06F 21/32 | 713/155 |
| 2016/0099811 A1* | 4/2016 | Hawblitzel | G06F 21/575 | 713/176 |
| 2017/0090909 A1* | 3/2017 | Guo | G06F 8/66 | |

* cited by examiner

TRUSTED MANAGEMENT CONTROLLER FIRMWARE

BACKGROUND

Field

This application relates to computer systems, and more particularly to a system and method for ensuring management controller firmware security.

Background

Typically, a management controller such as a baseboard management controller (BMC) resides on each computing device. The BMC includes a microcontroller that manages interfaces between system management software and platform hardware. The BMC monitors different types of sensors built into the device on parameters such as temperature, cooling fan speeds, power status, load status, operating system status, etc. The BMC runs independent of a processor of the computing device and hence in any event of processor, memory or any other hardware failure, the BMC should still provide the services.

Firmware is a type of software that provides control, monitoring and data manipulation for devices installed upon. Firmware such as the program of an embedded system may be the only program that will run on the system and provide all of its functions. Firmware is held in non-volatile memory devices such as ROM, EPROM, or flash memory. Most firmware can be updated or replaced. Common reasons for updating firmware include fixing bugs or adding features to the device. This may require ROM integrated circuits to be physically replaced, or flash memory to be reprogrammed through a special procedure.

Firmware for the BMC of a computing device controls all functions of the BMC. However, the firmware of the BMC can be compromised. Malicious firmware can be loaded into the BMC through firmware update or other methods. Malicious firmware controlling the BMC can cause serious hardware and/or data damage to the computing device if not immediately found and stopped.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a method for ensuring management controller firmware security, by a security manager of a computing device, includes storing a public key and raw identity data, and obtaining, from a management firmware for a management controller of the computing device, encrypted identity data. The security manager decrypts the encrypted identity data with the public key into decrypted identity data, and compares the decrypted identity data with the raw identity data to determine whether the management firmware is authentic. The security manager protects the computing device from harm by the management firmware, in response to determining that the management firmware is not authentic.

In some implementations, a method for ensuring management controller firmware security, by a manufacturer of a computing device, includes generating a pair of security keys including a public key and a private key, and encrypting raw identity data using the private key to encrypted identity data. The manufacturer embeds the encrypted identity data in a management firmware for a management controller of the computing device, and embeds the public key and the raw identity data in a security manager of the computing device, the security manager configured to: obtain, from the management firmware, the encrypted identity data; decrypt the encrypted identity data with the public key into decrypted identity data; compare the decrypted identity data with the raw identity data to determine whether the management firmware is authentic; and protect the computing device from harm by the management firmware, in response to determining that the management firmware is not authentic.

In some implementations, a computing device includes a management controller running a management firmware storing encrypted identity data and a security manager storing a public key and raw identity data. The security manager is configured to obtain, from a management firmware for a management controller of the computing device, encrypted identity data. The security manager is configured to decrypt the encrypted identity data with the public key into decrypted identity data. The security manager is configured to compare the decrypted identity data with the raw identity data to determine whether the management firmware is authentic. The security manager is further configured to protect the computing device from harm by the management firmware, in response to determining that the management firmware is not authentic.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for ensuring management controller firmware security. Various aspects of the present technology are described with reference to the drawings. In the following description, for purposes of explanation, numerous specific details are set forth in order to provide a thorough understanding of one or more aspects. It is evident, however, that the present technology can be practiced without these specific details. In other instances, well-known structures and devices are shown in block diagram form in order to facilitate describing these aspects.

The subject disclosure provides a method of quickly discovering malicious firmware running on a management controller (e.g., a BMC) of a computing device and preventing the malicious firmware from causing damage to the computing device.

Figure 1:
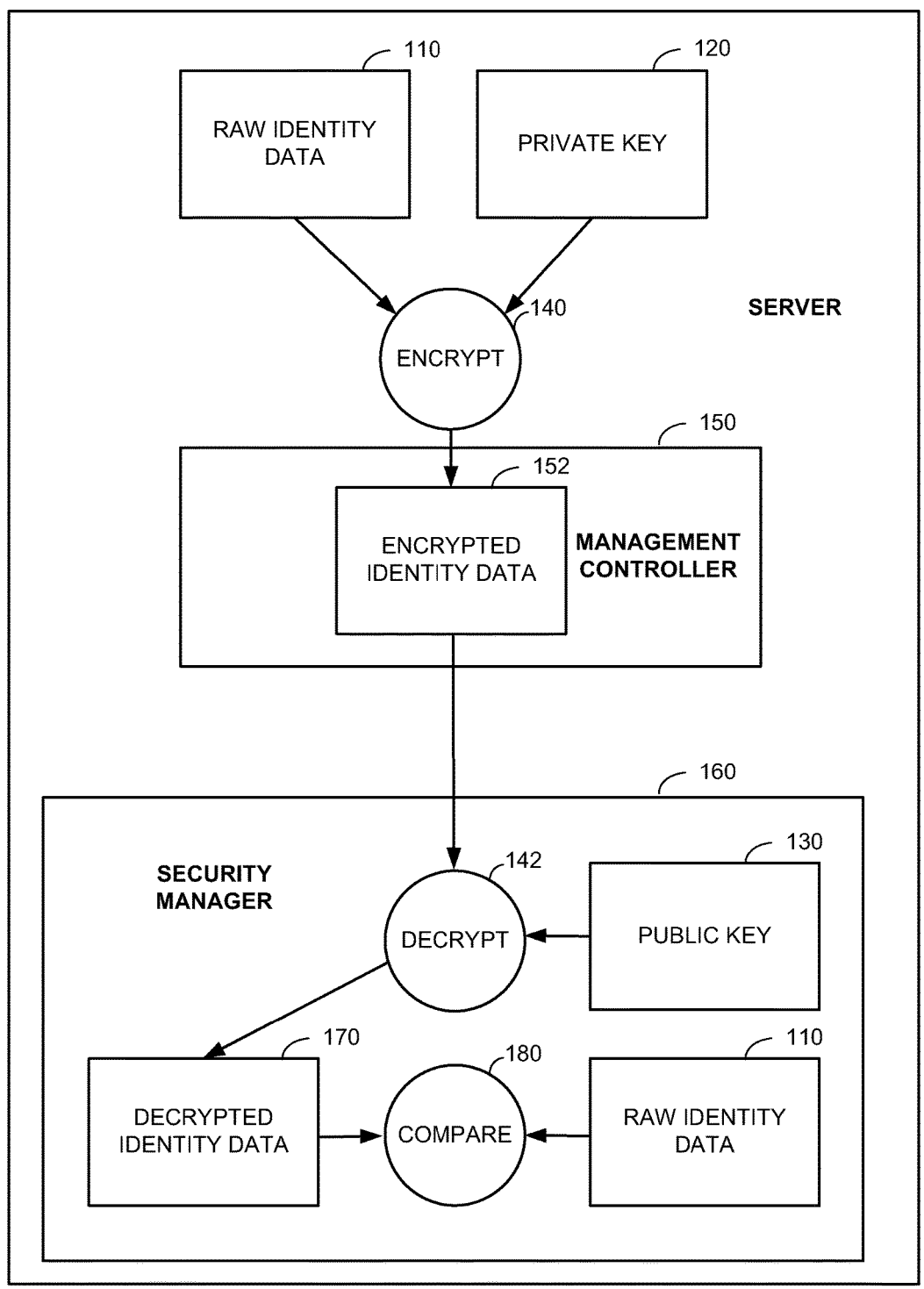
FIG. 1 illustrates a block diagram of an example system for ensuring management controller firmware security.

FIG. 1 illustrates a block diagram of an example system for ensuring management controller firmware security. A computing device 100 includes a management controller 150 and a security manager 160. The security manager 160 determines whether management firmware loaded on the management controller 150 is authentic by using an encryption and decryption verification process described below.

In some aspects, the security manager 160 includes a basic input/output system (BIOS). In some other aspects, the security manager 160 includes one of security software running on an operating system (OS) of the computing device 100, security software running on a network device in communication with the computing device 100 over a network, a rack management controller (RMC) of a server rack that comprises the computing device 100, or a chassis management controller (CMC) for the computing device 100.

In some aspects, the management controller 150 includes a baseboard management controller (BMC) 150. In some other aspects, the management controller 150 includes any one of various other controllers in the computing device 100. In some aspects, the management controller 160 includes the BIOS, while the security manager includes at least one of the BMC 150, a RMC, or a CMC. The BMC 150 includes a microcontroller that manages interfaces between system management software and platform hardware. The BMC 150 monitors different types of sensors built into the computing device 100 on parameters such as temperature, cooling fan speeds (i.e., for both fans internal to the device and fans 140 for the computing device rack 102), power status, load status, operating system status, etc. In some embodiments, the BMC 150 communicates with various computing device components that the BMC 150 manages using an Intelligent Platform Management Interface (IPMI) protocol. IPMI is a set of specifications for an autonomous computer subsystem that manages and monitors the computing device's CPU, firmware, and OS, and for out-of-band management and monitoring by system administrators. However, the various embodiments are not limited in this regard and other protocols may be used by the BMC 150. The BMC 150 can also connect to various computing device components (e.g., southbridge or network controller) using any bus interface such as the system management bus (SMBus), RS-232 serial bus, IIC protocol, Ethernet, IPMB, low-pin count (LPC) bus, etc.

Management firmware is loaded on the BMC 510 to control all functions of the BMC 150. However, as noted above, the management firmware of the BMC 150 can be compromised, putting the entire computing device 100 at risk. For example, malicious management firmware can be loaded into the BMC 150 through firmware update or other methods. When malicious management firmware is controlling the BMC 150, the BMC 150 can cause serious hardware and/or data damage to the computing device.

To address these issues, the present disclosure contemplates implementing in the computing device 100 a verification scheme. In particular, to allow later verification of the authenticity of the management firmware loaded on the BMC 150, encrypted identity data 152 is stored on the management firmware. This encrypted identity data 152 can then be verified by the computing device 100 prior to allowing the BMC 150 to perform its management functions.

In some embodiments, the encrypted identity data 152 is generated from raw identity data 110 and a private key 120. The raw identity data 110 can include any string of data. For example, the raw identity data can include a computing device manufacturer name, a product name, a device model identification, a customer name, a management controller hardware identification, a date, and/or a time, etc. The raw identity data 110 can also include text data and/or hash data. Hash data includes hash values, which are numbers generated from strings of text. The hash value is substantially smaller than the text itself, and is generated by a formula in such a way that it is extremely unlikely that some other text will produce the same hash value. Hash data help to ensure that files, messages, or data have not been tampered with.

The private key 120 is one of a pair of security keys that also includes a public key 130. The private key 120 is kept secret, but the public key 130 does not need to be kept secret. Although different, the public key 130 and the private key 120 of this security key pair are mathematically linked by a public-key algorithm. The public key 130 is used to verify a digital signature. The private key 120 is used for the opposite operation, to create the digital signature. For example, each of the private key 120 and public key 130 can include a string of text data. For example, a public key 130 can include a long list of hexadecimal digits such as "3048 0241 00C9 18FA CF8D EB2D".

Below is an extremely simplified example of generating a private key from a public key:

If "private key 120"=7 the public key 130 can be determined by solving the equation:

("private key 120"×"public key 130") modulo 40=1

Then (7×"public key 130") modulo 40=1

Then "public key 130"=23

In some aspects the public-key algorithm is based on mathematical problems that currently admit no efficient solution and are inherent in certain integer factorization, discrete logarithm, and elliptic curve relationships. However, it is computationally easy to generate a public and private key-pair and to use it for encryption and decryption. The strength of the public-key algorithm lies in the computational impracticality for a properly generated private key to be determined from its corresponding public key. Thus the public key may be published without compromising security. Security depends only on keeping the private key private. Public key algorithms, unlike symmetric key algorithms, do not require a secure channel for the initial exchange of secret keys between parties.

The raw identity data 110 is encrypted using the private key 120 to generate the encrypted identity data 152. The encrypted identity data 152 is then stored and/or built into the management firmware of the management controller 150. In some aspects, the encrypted identity data 152 can be embedded into the management firmware of the management controller 150 during manufacturing of the management controller 150.

A BIOS software program that runs on a BIOS chip 160 located on a motherboard of the computing device 100. The BIOS 160 stores firmware executed when the computing device 100 is first powered on along with a set of configurations specified for the BIOS 160. The BIOS firmware and BIOS configurations are stored in a non-volatile memory such as a read-only memory (ROM).

The BIOS 160 recognizes, initializes, and testes hardware present in the computing device 100 based on the set of configurations. The BIOS 160 can perform self-test, such as a Power-on-Self-Test (POST), on the computing device 100.

This self-test can test functionality of various hardware components such as hard disk drives, optical reading devices, cooling devices, memory modules, expansion cards and the like. The BIOS 160 can address and allocate an area in system memory in to store an operating system (OS). The BIOS 160 can then give control of the computer system to the OS.

The BIOS 160 provides an interface that allows a variety of different parameters to be set. For example, the BIOS 160 may be used to specify clock and bus speeds, specify what peripherals are attached to the computing device 100, specify monitoring of health (e.g., fan speeds and CPU temperature limits), and specify a variety of other parameters that affect overall performance and power usage of the computing device 100.

The public key 130 is stored in the BIOS 160. In addition, an identical copy of the raw identity data 110 used for encrypting the encrypted identity data stored in the BMC 150 is also stored in the BIOS 160. In some aspects, the public key 130 and the raw identity data 110 can be embedded into the BIOS 160 during manufacturing of the BIOS 160.

In operation, the BIOS 160 requests the encrypted identity data 152 from the BMC 150 by sending a command. The command can use on any computer device management specification and/or protocol, such as IPMI, Representational State Transfer (REST), etc. For example, the request command can be sent during computing device boot up or after loading the OS. The BMC 150 then returns the encrypted identity data 152 to the BIOS 160.

In some aspects, the BMC 150 and the BIOS 160 include a shared memory such as Dynamic random-access memory (DRAM), Electrically Erasable Programmable Read-Only Memory (EEPROM), mailbox registers, etc. The BIOS 160 obtains the encrypted identity data 152 from the BMC 150 by requesting for the encrypted identity data 152 stored on a shared memory for the BIOS 160 and the BMC 150.

The BIOS 160 decrypts the encrypted identity data 152 using the public key 130 into decrypted identity data 170. The BIOS 160 then compares the decrypted identity data 170 with the raw identity data 110. If the decrypted identity data 170 is not identical to the raw identity data 110, then the BIOS 160 determines that the management firmware running on the BMC 150 is not authentic.

Returning to the extremely simplified example describe above for generating a pair security keys:

If "private key 120"=7
the public key 130 can be determined by solving the equation:

("private key 120"×"public key 130") modulo 40=1

Then (7×"public key 130") modulo 40=1
Then "public key 130"=23
An example raw identity data 110 can be encrypted into the encrypted identity data 152 using the encryption equation:

"encrypted identity data 152"=("raw identity data 110")$^{("private key 120")}$ modulo 55

If the "raw identity data 110"=2
Then "encrypted identity data 152"=$2^7$ modulo 55=18
"encrypted identity data 152"=18 is stored in the BMC 150. The BIOS 160 then decrypts the encrypted identity data 152 with the equation:

"decrypted identity data 170"=("encrypted identity data 152")("public key 130") modulo 55

Then "decrypted identity data 170"=$18^{23}$ modulo 55=2

In this example, the decrypted identity data 170 is equal to the raw identity data 110, and therefore the BIOS 160 determines the management firmware to be authentic.

If the BIOS 160 determines that the management firmware running on the BMC 150 is not authentic, the BIOS 160 proceeds to protect the computing device from harm by the management firmware. For example, the BIOS 160 can disable the BMC 150, prevent boot into the OS, shut down the computing device 100, and/or outputting a warning on a display to be viewed by an administrator.

Alternatively or in addition to the foregoing measures, the BIOS 160 can trigger a refresh of the firmware in the BMC 150. For example, in some embodiments, the BIOS 160 can be configured to generate a command to cause BMC 150 to download and install a fresh copy of the firmware. In another example, a "gold" or trusted version of the firmware may be stored at computing device and the BIOS 160 can be configured to generate a command to cause BMC 150 to access and install this trusted version of the firmware. In some embodiments, the BIOS 160 can repeat the verification process after the refresh. In some embodiments, the refresh and re-verification process can be repeated at least one time before the BIOS 160 disables the BMC 150, prevents boot into the OS, shuts down the computing device 100, outputs a warning on a display to be viewed by an administrator, or takes other action to protect the computing device.

Figure 2:
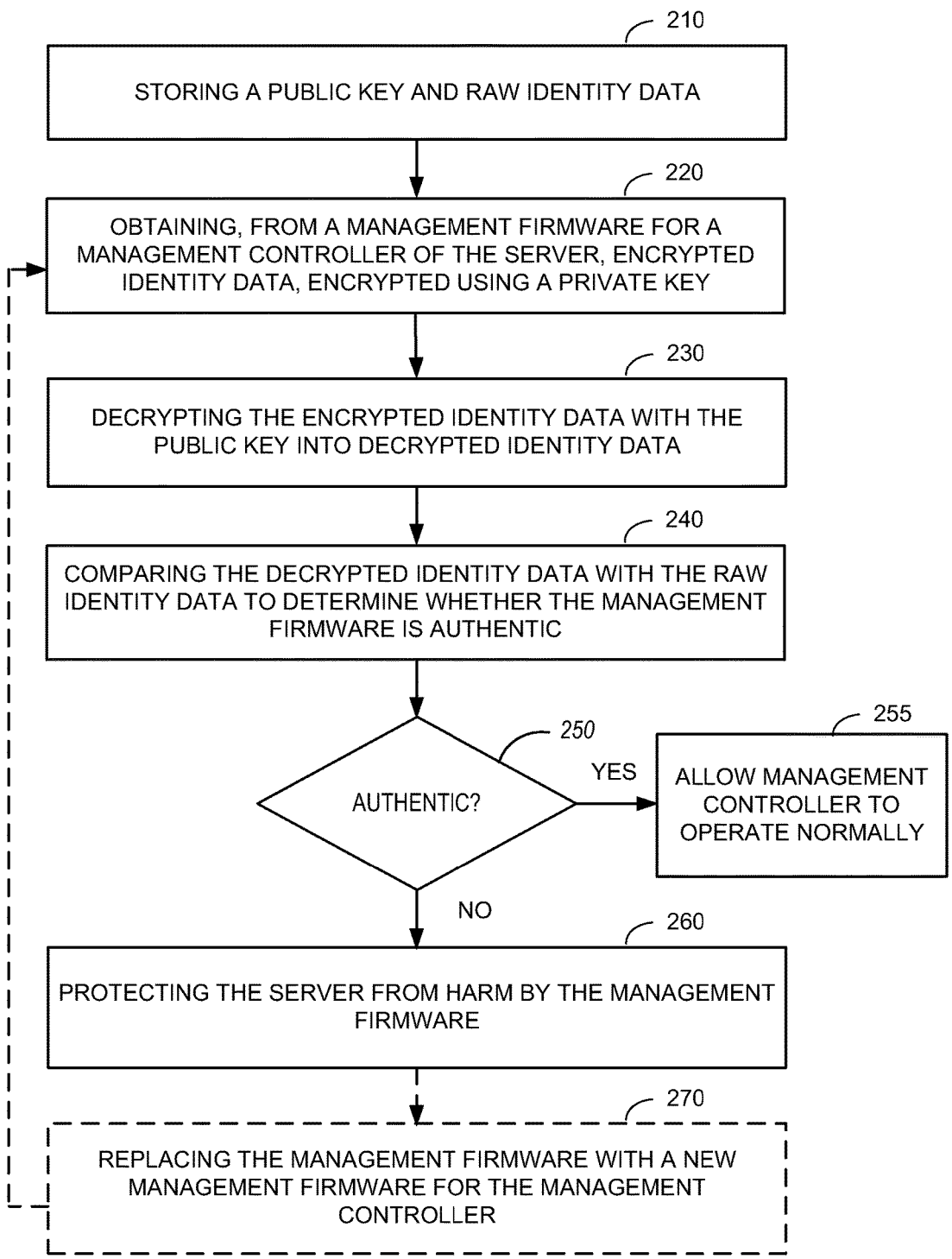
FIG. 2 illustrates an example methodology for ensuring management controller firmware security.

FIG. 2 illustrates an example methodology 200 for ensuring management controller firmware security.

At step 210, a security manager of a computing device stores a public key and raw identity data.

At step 220, the security manager obtains, from a management firmware for a management controller of the computing device, encrypted identity data.

At step 230, the security manager decrypts the encrypted identity data with the public key into decrypted identity data.

At step 240, the security manager compares the decrypted identity data with the raw identity data to determine whether the management firmware is authentic.

At step 250, the method 200 proceeds to step 255 if the management firmware is determined authentic. The method 200 proceeds to step 260 if the management firmware is determined not authentic.

At step 255, the security manager allows the management controller to operate normally.

At step 260, the security manager protects the computing device from harm by the management firmware, in response to determining that the management firmware is not authentic.

At optional step 270, the security manager replaces the management firmware with a new management firmware for the management controller. The method 200 then proceeds back to step 220.

Figure 3:
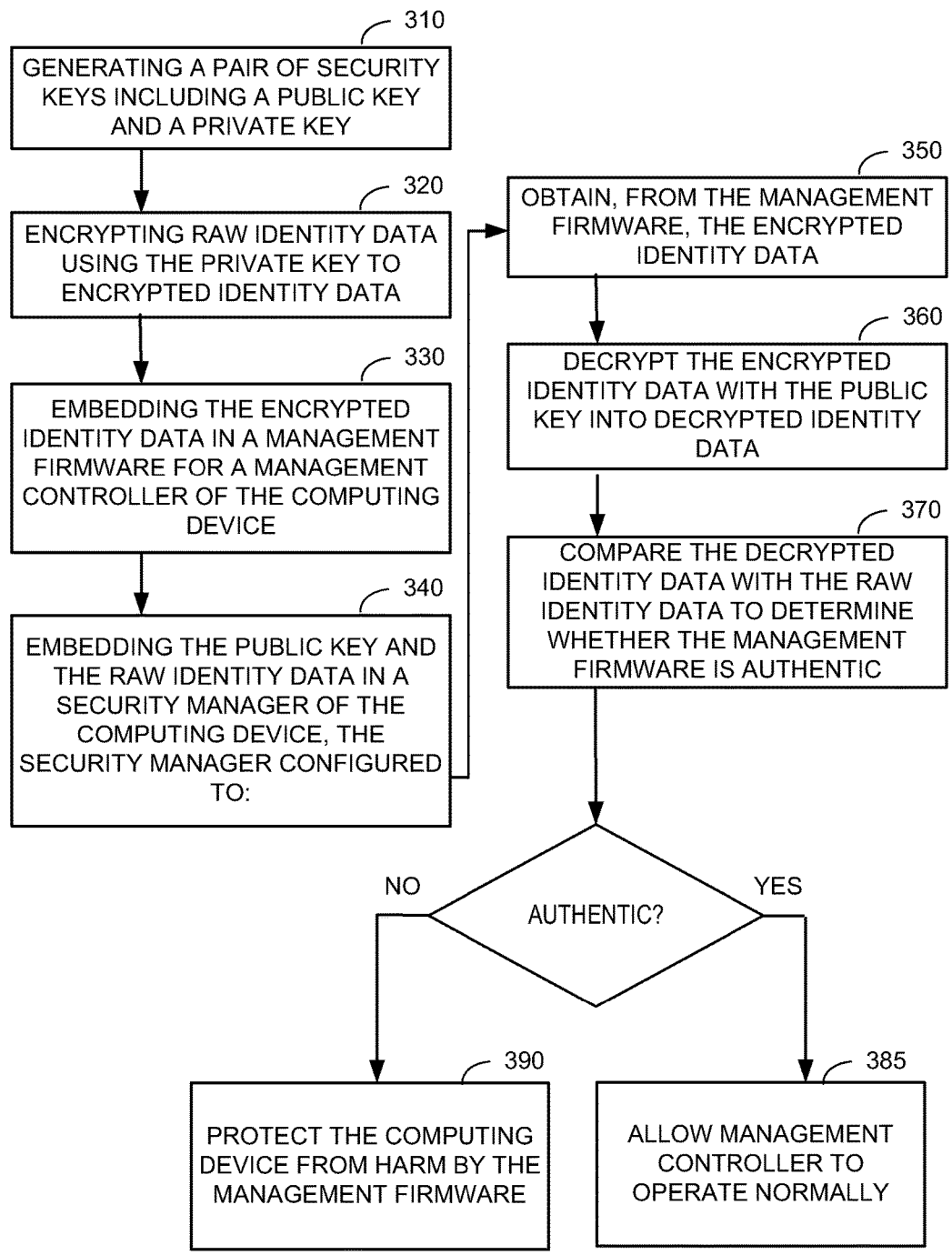
FIG. 3 illustrates another example methodology for ensuring management controller firmware security.

FIG. 3 illustrates another example methodology 300 for ensuring management controller firmware security.

At step 310, a manufacturer of a computing device generates a pair of security keys including a public key and a private key.

At step 320, the manufacturer encrypts raw identity data using the private key to encrypted identity data.

At step 330, the manufacturer embeds the encrypted identity data in a management firmware for a management controller of the computing device.

At step 340, the manufacturer embeds the public key and the raw identity data in a security manager of the computing device.

At step 350, the security manager obtains from the management firmware, the encrypted identity data.

At step 360, the security manager decrypts the encrypted identity data with the public key into decrypted identity data.

At step 370, the security manager compares the decrypted identity data with the raw identity data to determine whether the management firmware is authentic.

At step 380, the method 300 proceeds to step 385 if the management firmware is determined authentic. The method 300 proceeds to step 390 if the management firmware is determined not authentic.

At step 390, the security manager protects the computing device from harm by the management firmware, in response to determining that the management firmware is not authentic.

Figure 4:
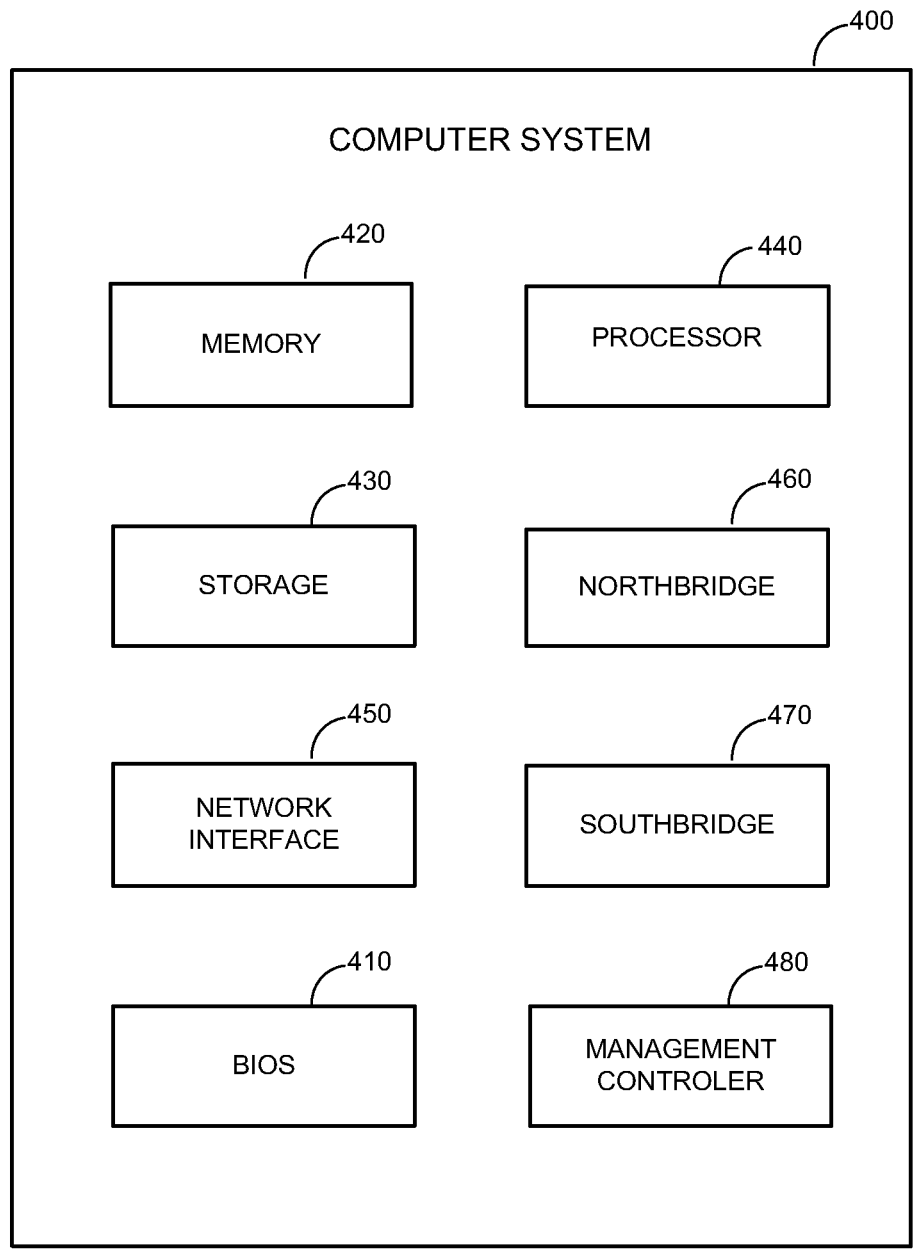
FIG. 4 illustrates a block diagram of an example computing device.

FIG. 4 illustrates a block diagram of an example computing device 400. The computer system 400 includes a processor 440, a network interface 450, a management controller 480, a memory 420, a storage 430, a BIOS 410, a northbridge 460, and a southbridge 470.

The computer system 400 is, for example, a computing device (e.g., a computing device in a computing device rack of a data center) or a personal computer. The processor (e.g., central processing unit (CPU)) 440 is a chip on a motherboard that retrieves and executes programming instructions stored in the memory 420. The processor 440 is a single CPU with a single processing core, a single CPU with multiple processing cores, or multiple CPUs. One or more buses (not shown) transmit instructions and application data between various computer components such as the processor 440, memory 420, storage 430, and networking interface 450.

The memory 420 includes any physical device used to temporarily or permanently store data or programs, such as various forms of random-access memory (RAM). The storage 430 includes any physical device for non-volatile data storage such as a HDD or a flash drive. The storage 430 can have a greater capacity than the memory 420 and can be more economical per unit of storage, but can also have slower transfer rates.

The BIOS 410 includes a Basic Input/Output System or its successors or equivalents, such as an Extensible Firmware Interface (EFI) or Unified Extensible Firmware Interface (UEFI). The BIOS 410 includes a BIOS chip located on a motherboard of the computer system 400 storing a BIOS software program. The BIOS 410 stores firmware executed when the computer system is first powered on along with a set of configurations specified for the BIOS 410. The BIOS firmware and BIOS configurations are stored in a non-volatile memory (e.g., NVRAM) or a ROM such as flash memory. Flash memory is a non-volatile computer storage medium that can be electronically erased and reprogrammed.

The BIOS 410 is loaded and executed as a sequence program each time the computer system 400 is started. The BIOS 410 recognizes, initializes, and tests hardware present in a given computing system based on the set of configurations. The BIOS 410 performs self-test, such as a Power-on-Self-Test (POST), on the computer system 400. This self-test tests functionality of various hardware components such as hard disk drives, optical reading devices, cooling devices, memory modules, expansion cards and the like. The BIOS addresses and allocates an area in the memory 420 in to store an operating system. The BIOS 410 then gives control of the computer system to the OS.

The BIOS 410 of the computer system 400 includes a BIOS configuration that defines how the BIOS 410 controls various hardware components in the computer system 400. The BIOS configuration determines the order in which the various hardware components in the computer system 400 are started. The BIOS 410 provides an interface (e.g., BIOS setup utility) that allows a variety of different parameters to be set, which can be different from parameters in a BIOS default configuration. For example, a user (e.g., an administrator) can use the BIOS 410 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 480 is a specialized microcontroller embedded on the motherboard of the computer system. For example, the management controller 480 is a baseboard management controller (BMC). The management controller 480 manages the interface between system management software and platform hardware. Different types of sensors built into the computer system report to the management controller 480 on parameters such as temperature, cooling fan speeds, power status, operating system status, etc. The management controller 480 monitors the sensors and has the ability to send alerts to an administrator via the network interface 450 if any of the parameters do not stay within preset limits, indicating a potential failure of the system. The administrator can remotely communicate with the management controller 480 to take some corrective action such as resetting or power cycling the system to restore functionality.

The northbridge 460 is a chip on the motherboard that can be directly connected to the processor 440 or is integrated into the processor 440. In some instances, the northbridge 460 and the southbridge 470 is combined into a single die. The northbridge 460 and the southbridge 470, manage communications between the processor 440 and other parts of the motherboard. The northbridge 460 manages tasks that require higher performance than the southbridge 470. The northbridge 460 manages communications between the processor 440, the memory 420, and video controllers (not shown). In some instances, the northbridge 460 includes a video controller.

The southbridge 470 is a chip on the motherboard connected to the northbridge 460, but unlike the northbridge 460, need not be directly connected to the processor 440. The southbridge 470 manages input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 400. The southbridge 470 connects to or includes within the southbridge 470 the management controller 480, Direct Memory Access (DMAs) controllers, Programmable Interrupt Controllers (PICs), and a real-time clock. In some instances, the southbridge 470 directly connects to the processor 440, such as in the case where the northbridge 460 is integrated into the processor 440.

The networking interface 450 is any interface that supports wired or wireless Local Area Networks (LANs) or Wide Area Networks (WANs), such as Ethernet, Fibre Channel, Wi-Fi, Bluetooth, Firewire, the Internet, etc. For example, the networking interface 450 can include a network interface controller (NIC) for Ethernet. Ethernet has been the most widely used networking standard for connecting computers in both Local Area Networks (LANs) and Wide Area Networks (WANs). Ethernet defines a number of wiring and signaling standards for the physical layer (PHY), through means of network access at the Media Access Control (MAC)/Data Link Layer, and through a common addressing format. Ethernet enabled devices typically communicate by transmitting data packets, which comprise blocks of data that are individually sent and delivered.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor is a microprocessor, or in the alternative, any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor reads information from, and write information to, the storage medium. In the alternative, the storage medium is integral to the processor. The processor and the storage medium resides in an ASIC. The ASIC resides in a user terminal. In the alternative, the processor and the storage medium resides as discrete components in a user terminal.

In one or more exemplary designs, the functions described is implemented in hardware, software, firmware, or any combination thereof. If implemented in software, the functions are stored on or transmitted over as one or more instructions or code on a non-transitory computer-readable medium. Non-transitory computer-readable media includes both computer storage media and communication media including any medium that facilitates transfer of a computer program from one place to another. A storage media is any available media that can be accessed by a general purpose or special purpose computer. By way of example, and not limitation, such computer-readable media includes RAM, flash memory, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method for ensuring management controller firmware security, by a security manager for a computing device, comprising:
   storing, at the security manager, a public key and raw identity data, the raw identity data including one or more of a manufacturer name of the computing device, a product name of the computing device, a device model identification of the computing device, a date, a time, text data or hash data;
   receiving, from a management firmware for a management controller of the computing device, encrypted identity data, wherein the encrypted identity data is encrypted using a private key based upon an identical copy of the raw identity data stored on the management controller, the private key being paired with the public key;
   decrypting the encrypted identity data into decrypted identity data using the public key;
   comparing, by the security manager, the decrypted identity data with the raw identity data to determine whether the management firmware is authentic;
   protecting the computing device from harm by the management firmware, in response to determining that the management firmware is not authentic;
   replacing the management firmware with a new management firmware for the management controller;
   obtaining, from the new management firmware, the encrypted identity data;
   decrypting the encrypted identity data with the public key into decrypted identity data;
   comparing the decrypted identity data with the raw identity data to determine whether the new management firmware is authentic; and
   protecting the computing device from harm by the new management firmware, in response to determining that the new management firmware is not authentic.

2. The method of claim 1, further comprising:
   sending a request command to the management controller for the encrypted identity data, wherein the request command uses at least one of Intelligent Platform Management Interface (IPMI) or Representational State Transfer (REST) interface; and
   receiving the encrypted identity data from the management controller.

3. The method of claim 1, wherein protecting the computing device comprises at least one of:
   disabling the management controller;
   preventing boot into an operating system of the computing device;
   shutting down the computing device; or
   outputting a warning on a display.

4. The method of claim 1, wherein the security manager comprises a basic input/output system (BIOS) of the computing device.

5. The method of claim 4, further comprising requesting for the encrypted identity data stored on a shared memory for the BIOS and the management controller.

6. The method of claim 1, wherein the security manager comprises security software running on an operating system (OS) of the computing device.

7. The method of claim 1, wherein the security manager comprises security software running on a network device in communication with the computing device over a network.

8. The method of claim 1, wherein the security manager comprises a rack management controller (RMC) of a server rack that comprises the computing device.

9. The method of claim 1, wherein the security manager comprises a chassis management controller (CMC) for the computing device.

10. The method of claim 1, wherein the management controller comprises a baseboard management controller (BMC).

11. The method of claim 1, wherein the raw identity data is based upon a customer name.

12. A method for ensuring management controller firmware security, by a manufacturer of a computing device, comprising:
   generating a pair of security keys including a public key and a private key;
   encrypting raw identity data using the private key to encrypted identity data, the raw identity data including one or more of a manufacturer name of the computing device, a product name of the computing device, a device model identification of the computing device, a date, a time, text data or hash data;
   embedding the encrypted identity data in a management firmware for a management controller of the computing device; and
   embedding the public key and the raw identity data in a security manager of the computing device, the security manager configured to:
   receive, from the management firmware, the encrypted identity data, wherein the encrypted identity data is encrypted using the private key based upon an identical copy of the raw identity data stored on the management controller, the private key being paired with the public key;
   decrypt the encrypted identity data into decrypted identity data using the public key;
   compare the decrypted identity data with the raw identity data to determine whether the management firmware is authentic;
   protect the computing device from harm by the management firmware, in response to determining that the management firmware is not authentic;
   replace the management firmware with a new management firmware for the management controller;
   obtain, from the new management firmware, the encrypted identity data;
   decrypt the encrypted identity data with the public key into decrypted identity data;
   compare the decrypted identity data with the raw identity data to determine whether the new management firmware is authentic; and
   protect the computing device from harm by the new management firmware, in response to determining that the new management firmware is not authentic.

13. A computing device, comprising:
   a management controller running a management firmware storing encrypted identity data;
   a security manager storing a public key and raw identity data, the raw identity data including one or more of a manufacturer name of the computing device, a product name of the computing device, a device model identification of the computing device, a date, a time, text data or hash data, the security manager configured to:
   receive, from the management firmware for the management controller of the computing device, encrypted identity data, wherein the encrypted identity data is encrypted using a private key based upon an identical copy of the raw identity data stored on the management controller, the private key being paired with the public key;
   decrypt the encrypted identity data with the public key into decrypted identity data using the public key;
   compare the decrypted identity data with the raw identity data to determine whether the management firmware is authentic;
   protect the computing device from harm by the management firmware, in response to determining that the management firmware is not authentic;
   replace the management firmware with a new management firmware for the management controller;
   obtain, from the new management firmware, the encrypted identity data;
   decrypt the encrypted identity data with the public key into decrypted identity data;
   compare the decrypted identity data with the raw identity data to determine whether the new management firmware is authentic; and
   protect the computing device from harm by the new management firmware, in response to determining that the new management firmware is not authentic.

14. The computing device of claim 13, wherein the security manager comprises a basic input/output system (BIOS).

15. The computing device of claim 14, further comprising a shared memory for the BIOS and the management controller.

16. The computing device of claim 13, wherein the security manager is further configured to:
   send a request command to the management controller for the encrypted identity data, wherein the request command uses at least one of Intelligent Platform Management Interface (IPMI) or Representational State Transfer (REST) interface; and
   receive the encrypted identity data from the management controller.

17. The computing device of claim 13, wherein protect the computing device comprises at least one of:
   disable the management controller;
   prevent boot into an operating system of the computing device;
   shut down the computing device; or
   output a warning on a display.

18. The computing device of claim 13, wherein the security manager comprises security software running on an operating system (OS) of the computing device.

19. The computing device of claim 13, wherein the security manager comprises security software running on a network device in communication with the computing device over a network.

20. The computing device of claim 13, wherein the security manager comprises a rack management controller (RMC) of a server rack that comprises the computing device.

* * * * *